United States Patent [19]
DeLano et al.

[11] Patent Number: 4,856,795
[45] Date of Patent: Aug. 15, 1989

[54] MULTIPLE DUROMETER SHIELD FOR BALL JOINT

[75] Inventors: Don L. DeLano, Mount Clemens; Edward K. Benda, Farmington Hills, both of Mich.

[73] Assignee: Chemcast Corporation, Madison Heights, Mich.

[21] Appl. No.: 76,107

[22] Filed: Jul. 21, 1987

[51] Int. Cl.$^4$ .......................... F16O 3/84; F16J 15/16; F16J 15/52
[52] U.S. Cl. ............................... 277/212 FB; 74/18.1; 403/50; 403/134; 464/173
[58] Field of Search ........................ 277/212 FB, 227; 403/51, 50, 134; 74/18.1; 264/261, 255, DIG. 60; 156/245; 464/175, 173; 138/21

[56] References Cited

U.S. PATENT DOCUMENTS

| | | |
|---|---|---|
| 2,559,857 | 7/1951 | Edwards . |
| 2,744,340 | 5/1956 | Gerber ............................ 264/261 X |
| 3,035,309 | 5/1962 | Bingham, Jr. .......... 264/DIG. 60 X |
| 3,129,023 | 4/1964 | Fierstine ................... 277/212 FB X |
| 3,164,389 | 1/1965 | Thomas . |
| 3,175,834 | 3/1965 | Wallace et al. . |
| 3,248,955 | 5/1966 | Templeton ........................ 403/51 X |
| 3,262,706 | 7/1966 | Hassan ............................ 403/134 X |
| 3,279,834 | 10/1966 | Budzynski ............................ 403/51 |
| 3,292,957 | 12/1966 | Ulderup . |
| 3,322,445 | 5/1967 | Hassan ................................. 403/51 |
| 3,901,518 | 8/1975 | Uchida . |
| 3,908,704 | 9/1975 | Clement et al. ........................ 138/21 |
| 4,121,844 | 10/1978 | Nemoto et al. ..................... 74/18.1 X |
| 4,201,209 | 5/1980 | LeVeen et al. .................. 264/255 X |
| 4,327,925 | 5/1982 | Alexander et al. .............. 264/271.1 |
| 4,360,209 | 11/1982 | Ukai et al. ..................... 277/212 FB |
| 4,524,943 | 6/1985 | Busch et al. ..................... 264/334 X |
| 4,685,686 | 8/1987 | Weiler ........................... 277/212 FB |

FOREIGN PATENT DOCUMENTS 954690  4/1964  United Kingdom ............... 403/134

Primary Examiner—Allan N. Shoap
Attorney, Agent, or Firm—Jay C. Taylor; Neal A. Waldrop

[57] ABSTRACT

A one-piece multiple durometer molded plastic dust and moisture shield for a lubricated assembly comprises a bowl-shaped intermediate part of resiliently deformable plastic material axially spacing and intimately bonded to an annular reinforcing rim and an annular reinforcing base of hard, form-sustaining plastic material. The rim extends coaxially around the bowl mouth of the shield and is bonded to the axially adjacent portion to define one axial end of the shield dimensioned to interfit in sealing engagement with the part to be shielded. The annular base extends coaxially with an annular base liner of the resiliently deformable intermediate portion an defines the opposite axial end of the shield. The annular base liner comprises the base of the bowl-shaped intermediate portion and its central opening is dimensioned to effect an interference sealing fit with another part of the assembly to be shielded. The diameter of the opening in the base liner is smaller than the diameter of the coaxial opening in the base so as to provide an inner periphery in the aforesaid sealing engagement with the assembly to be shielded. The remainder of the base liner and base are coextensive and are intimately bonded together to reinforce the base liner and stabilize its shape when in sealing engagement with the assembly to be shielded.

The shield is molded by partially solidifying the rim and base in separate mold cavities of a two-part mold, shaped so that the part containing the partially solidified rim can be inverted and interfitted coaxially within the mold part containing the cavity for the base to define a cavity for forming the resiliently flexible intermediate portion of the shield.

11 Claims, 1 Drawing Sheet

MULTIPLE DUROMETER SHIELD FOR BALL JOINT

This invention relates to a dust and moisture shield or boot especially adapted for use with an articulated lubricated assembly, as for example a conventional ball-joint assembly.

A typical shield of the type with which the present invention is concerned comprises a flexible plastic boot or sleeve adapted to fit over parts of an articulated assembly to be protected. The shield has axially spaced sealing portions intended to maintain fixed annular seals around separate axially spaced parts of the assembly. A conventional ball-joint assembly for which a protective sleeve or shield is required may comprise a ball-headed shaft having its head pivotally confined within a spherical socket in a socket housing. The shaft extends from the housing through an opening therein oversize with respect to the shaft diameter to enable limited universal pivoting of the shaft, which in turn may have a swinging operating lever or member removably secured to the swinging end of the shaft for pivoting about the longitudinal axis of the shaft.

In order to prevent the entry of contaminants into the socket housing via the oversize opening for the shaft, a conventional sleeve type shield is arranged in protective relationship over portions of the assembly by first sleeving the shield axially along the shaft (prior to securing the operating lever to the shaft) until a first axial end of the shield is seated in sealing engagement with the socket housing around the oversize opening for the shaft. Thereafter the opposite axial end of the sleeve is moved axially along the shaft toward the first axial end of the shield and to the final protective position of the shield by securing the operating lever or member on the shaft in seated sliding engagement with the opposite axial end of the shield. The sleeve opening at the last named opposite axial end of the shield conventionally engages the shaft snugly to provide a seal entirely around the circumference of the shaft. The intermediate portion of the customary shield is sufficiently flexible to enable its axial buckling at the final protective position to accommodate relative movement between the socket housing and operating lever during pivoting of the shaft.

Conventional shields of the type described above are subject to a number of objections. At the outset, the relatively movable parts of the articulated assembly require lubrication. Once the conventional shield is located in protective position on the assembly, it is impossible to determine by visual inspection whether or not the assembly has been properly lubricated. For example, the socket housing of a ball-and-socket type assembly is frequently provided with a grease fitting at a location externally of the protective shield, so that the ball and socket elements can be lubricated either before or after the shield is in place. Occasionally, when the assembly comes down the production line, the lubrication procedure is inadvertently omitted. If a careless worker then installs the shield, the lack of lubrication cannot be readily detected and premature failure of the assembly may result.

Another common objection to conventional shields of the type described is that the flexible material of the shield does not maintain its sealing effectiveness during articulation of the assembly. The shield material tends to stretch during use and to lose its elasticity with aging and thus loses its initial tight sealing engagement with the assembly. In attempts to avoid such problems, hard plastic or metal reinforcing rings have been bonded to or molded as inserts within the flexible plastic shield material adjacent to the regions required for sealing. However, such reinforcements are also objectionable in that they complicate the procedure for molding the shield and significantly increase the cost of the shields. In particular, in order to provide an effective seal around the shaft of a ball-and-socket type assembly wherein the shaft extends axially through an opening in the shield for example, a reinforcing ring for the latter seal must be carefully bonded to the shield coaxially with the latter opening. Such bonding in itself is a costly additional step in the formation of the shield. Also, when the reinforcing ring is bonded to the shield, either as an insert during the initial molding of the plastic shield or as an attachment to the molded shield, complex and expensive procedure is required to assure proper positioning and alignment of the reinforcing ring within the mold or with respect to the molded shield, as the case might be.

OBJECTS OF THE INVENTION

An important object of this invention is to provide a simple and improved dust shield of economical manufacture that avoids the above noted objections to conventional shields. A preferred form of the invention comprises a one-piece multiple durometer molded plastic body of resilient material having a readily flexible bowl-shaped intermediate major portion intimately bonded to an annular reinforcing rim and an annular reinforcing base that are axially spaced apart and comparatively hard and form-sustaining with respect to the more flexible major intermediate bowl-shaped portion. The annular rim extends coaxially around the bowl mouth of the softer intermediate portion at one axial end of the body and is coextensive with that end at the bond thereto. When the shield is mounted in protective position on a conventional ball-joint assembly, for example, the rim conforms resiliently to the socket housing and in cooperation with the axially adjacent softer portion of the body effects a sealing engagement with the socket housing around the shaft of a conventional ball-joint assembly. By virtue of the comparatively hard and form-sustaining qualities of the rim, the shape of the softer and immediately adjacent intermediate material and its sealing relationship with the socket housing are maintained during operation of the articulated members of the ball-joint assembly.

The annular reinforcing base is coaxial with an annular base liner of the resiliently flexible and softer bowl-shaped intermediate portion at the opposite axial end of the body. The annular base liner comprises the base of the bowl-shaped intermediate portion and the central opening of the annular liner opens coaxially into the bowl of the intermediate portion. The diameter of the central opening of the base liner is smaller than the diameter of the coaxial opening in the annular reinforcing base and is dimensioned to provide an interference fit around the shank of the ball-headed shaft of a ball-joint assembly. Otherwise the base and base liner are coextensive and intimately bonded together so that, except for the inner circumferential portion of the annular base liner dimensioned for sealing engagement with the ball-headed shaft, the shape of the comparatively soft resiliently flexible base liner is maintained to assure its sealing effectiveness with the ball-headed shaft during operation.

The dust shield may be mounted on the ball-joint assembly by sleeving the shield body, large bowl opening first, on the shaft end of the ball-headed shaft and moving the body axially along the shaft until the reinforcing rim around the bowl mouth seats against the socket housing. A swinging operating lever comprising part of the ball-joint assembly is then sleeved on the shaft and forced against the base of the shield body to urge the latter axially toward the rim and to cause resilient accordion-like folding of the softer sidewall of the bowl-shaped intermediate portion of the body. The resilient reaction of the folded intermediate body portion maintains the reinforcing rim and adjacent softer intermediate portion of the body in the aforesaid conforming and sealing engagement with the socket housing, thereby, in cooperation with sealing engagement between the ball-headed shaft and inner periphery of the base liner, to shield the lubricated portions of the ball-joint assembly from dust, water, and other contaminants.

Another object is to provide such a dust shield wherein the hard rigid base of the body also comprises an annular bead extending coaxially endwise of the body to provide a low friction, wear-resistant bearing surface for seating against the aforesaid swinging operating lever, which may be pivotal about the axis of the ball-headed shaft. By virtue of the bearing surface of the annular bead, pivoting of the swinging lever on the ball-headed shaft does not cause sufficient frictional drag on the dust shield to rotate the same relative to the ball-joint housing. In consequence, the rim remains fixed with respect to the housing against which it is seated, and the base remains fixed with respect to the ball-headed shaft. Relative cocking movement between base and rim out of coaxial alignment during articulation of the ball-joint is accommodated by flexing of the resiliently yieldable sidewall of the shield body.

Another object is to provide such a shield wherein at least the intermediate portion is molded from transparent flexible resilient plastic material, so that whether or not the articulated joint is lubricated can be readily observed after the shield is in place, and the use of an unlubricated assembly can be avoided.

Other objects are to provide such a shield capable of being molded by a relatively simple sequential process in a two-part mold, and to provide an improved method of molding such a shield wherein the plastic materials for forming the rim and base are introduced in liquid phase into separate rim forming and base forming cavities in separate mold parts respectively and partially solidified therein. The separate mold parts are dimensioned to interfit with each other in predetermined alignment and to provide, in cooperation with the partially solidified rim and base, a mold cavity for forming the intermediate portion of the body. The partial solidification of the plastic material for the base and rim assures that the partially solidified base within the base-forming cavity in one of said mold parts will not be significantly deformed when contacted, as explained below, by the plastic material in liquid phase for forming the intermediate bowl-shaped body portion, and assures that the partially solidified rim will retain its shape and remain in contact with the rim forming cavity in the other mold part when the latter is inverted and interfitted at said predetermined alignment with said one mold part.

After the partial solidification, plastic material for forming the intermediate body portion is then introduced in a liquid phase into said one mold part. The other mold part is then inverted and interfitted with the one mold part to provide the cavity for forming the intermediate body portion and to force the fluid material for forming the intermediate body portion into the latter cavity and into intimate contact with the partially solidified rim and base. Thereafter solidification of the plastic material for the entire body is completed by conventional means.

The material for forming the rim and base are selected to be compatible with the material for forming the intermediate body portion and to bond securely therewith during the molding process. By virtue of the process described, wherein the material for the intermediate body portion is introduced in a fluid phase into contact with the partially solidified rim and base of the body and thereafter solidified with the rim and base, a one-piece multiple durometer shield and optimum bonding of the intermediate portion with the rim and base portions are assured. Also by avoiding the necessity of providing separate reinforcing inserts for the base and rim, coaxial alignment of the harder rim and base with the softer intermediate portion is assured and the difficulty of centering separate inserts during a bonding or molding process is avoided. In consequence, production is simplified and a superior product with minimum rejects is obtained. The coaxial alignment of the hard base with the softer base liner is especially important because the effectiveness of the base liner seal around the circumference of the shank of the ball-headed shaft of a ball-and-socket type coupling depends upon such alignment.

Other objects of this invention will appear in the following description and appended claims, reference being had to the accompanying drawings forming a part of this specification wherein like reference characters designate corresponding parts in the several views.

IN THE DRAWINGS

Figure 1:
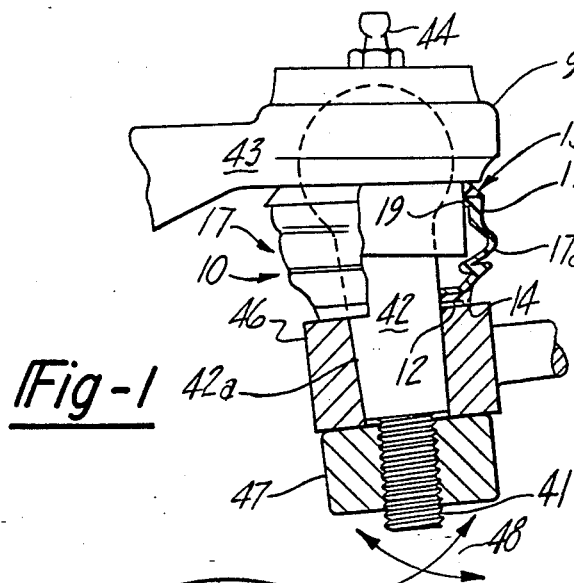
FIG. 1 is a side elevational view of a dust and moisture shield embodying the present invention and mounted on a conventional ball-joint assembly, portions being broken away to show details of construction.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DESCRIPTION OF THE INVENTION

Referring to the drawings, a dust shield comprising a preferred embodiment of present invention is illustrated in application with a conventional ball-joint assembly 9, FIG. 1, wherein a major resiliently flexible portion 17 of the shield is deformed or telescoped accordion-like under compression between parts of the assembly 9, as described below.

The dust shield comprises a one-piece cup-shaped molded body 10 of resilient plastic and annular section taken transversely of its principal axis. The one-piece body 10 has a part-receiving cavity or bowl 11, an annular reinforcing base 12, and an annular reinforcing rim 15 spaced axially from base 12 by the resilient shield portion 17. The base 12 comprises a comparatively hard, rigid, and form-sustaining plastic relative to the portion 17, defines one axial end of the body 10, provides a central shaft- receiving opening 13 that opens axially into the bowl 11, and has a radially outer periphery flush with the overlying outer surface of the portion 17. Base 12 also provides an annular peripheral wear-resistant bearing surface or bead 14 extending coaxially outwardly.

The rim 15 defines the axially opposite end of the body 10 and is shaped in accordance with the specific requirement of the assembly with which it is intended to be used, such as 9 in FIG. 1. The rim 15 also comprises a form-sustaining plastic comparable in hardness and rigidity to the base 12, may have the same or a different chemical formulation, and encircles the major axial opening 16 into the bowl 11. The flexible portion 17 of the body 10 comprises a sidewall 17a and an annular base liner 17b. The latter closely overlies the axially inner surface of the base 12 and is intimately bonded or adhered thereto. The central opening 18 of the base liner 17b is coaxial with the opening 13 and of small circumference to provide an interference sealing engagement with a shaft extending through the opening 13, as described below.

It is important to note that the liner 17b extends radially inwardly, i.e., normally to the axis of the seal 10, for only a comparatively short distance beyond the shaft receiving opening 13, and terminates radially at the opening 18. Thus the major portion of the liner 17b is supported by the base 12, so as not to buckle when under sealing pressure against a shaft, such as 42, FIG. 1. The short radial extension of the liner 17b radially beyond the opening 13 to the radial termination at 18 is on the order of magnitude of the axial thickness of the liner 17b and is thus also supported to make an effective seal with the shaft 42 when assembled therewith.

Figure 2:
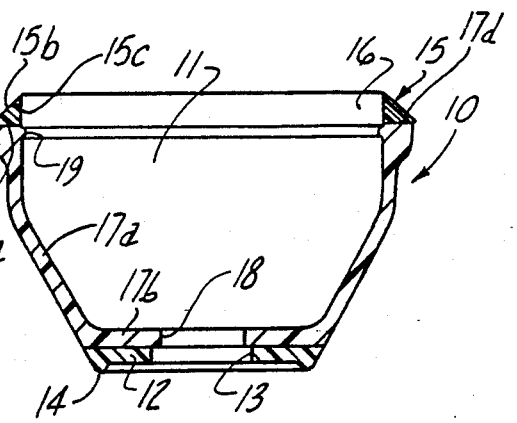
FIG. 2 is an enlarged axial mid-sectional view of the shield of FIG. 1, showing the shield in its undeformed condition after being removed from the ball-joint assembly.
Figure 3:
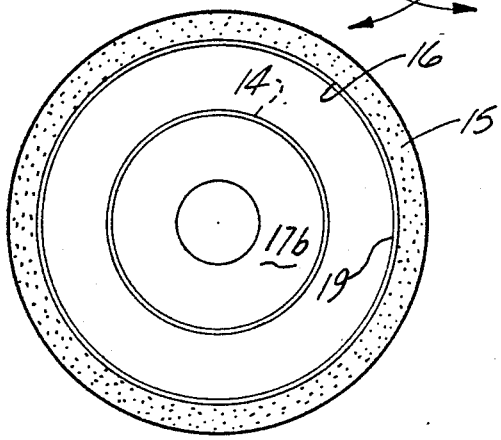
FIG. 3 is a plan view of FIG. 2.

The sidewall 17a adjacent to the major opening 16 enlarges radially at 17c to a thickness approximately twice the thickness of the major portion of the sidewall 17a and is intimately bonded at its axially outer end 17d to the radially coextensive axially inner surface 15a of the rim 15. The axially outer surface 15b of the rim 15 slopes radially outwardly in the axial direction from the rim 15 to the base 12 to provide a watershed for directing water away from the bowl opening 16 when the shield is mounted on a ball-joint assembly 9 as illustrated in FIG. 1.

Where desired, and optionally, the radially inner surface of the resiliently flexible portion 17 may be provided with an annular sealing ring or bead 19 coaxially around the axis of the bowl 11 at a location adjacent to the rim 15. When thus provided, the ring 19 provides a resiliently deformable bead and an interference sealing fit around a part of the ball-joint assembly 9 when mounted thereon, as may be seen in section, FIG. 1. In the absence of the sealing bead 19, the radially inner surface 15c of the rim 15 and adjacent inner surface of the wall 17a may provide a smooth unbroken cylindrical interior surface and may be shaped to conform snugly to the engaged portion of the ball-joint 9. As illustrated in FIG. 2, the surface 15c and adjacent inner surface of the portion 17c are cylindrical. These surfaces flex resiliently to conform tightly to the taper of the engaged portion of the ball-joint 9 and effect the seal thereat. Where the engaged portion of the ball-joint 9 is cylindrical, the inner surfaces 15c and of 17c are preferably dimensioned to provide a snug or interference fit with the ball-joint 9 at the seal. Also, as indicated in FIG. 1, as a consequence of the geometry of the ball-joint assembly 9, the rim 15 at the sealing position may not always be coaxial with the ball-joint housing 43. Accordingly, the rim 15 is sufficiently resilient to accommodate the necessary distortion required to conform to the engaged portion of the housing 43 and provide an effective seal therewith around the housing.

In a preferred embodiment of the dust shield, the material of the softer resilient major portion 17 may satisfactorily be fabricated from a low durometer polyvinylchloride, typically from 25 to 45 Shore A hardness, which will maintain sufficient flexibility to prevent cracking during operation at temperatures down to at least −40° F. and preferably down to −55° F., and which is capable of withstanding temperatures up to approximately 200° F. without deterioration during operation. The material for the harder and comparatively rigid base 12 and rim 15 may also comprise a polyvinylchloride capable of suitable operation within the same temperature range and having a durometer usually at least ten units higher than that of the portion 17 and typically having a hardness in the range between about 70 Shore A to about 60 Shore D.

Other plastics and polymers known to the art and used heretofore in shields and capable of operating within the temperature and hardness ranges noted above may of course be used. It is generally preferable that the material for the base 12 and rim 15 be the same but it is satisfactory if each element has physical coefficients, such as hardness and rigidity, different from the other. Specifically, the base 12 and bead 14 may be harder and more form-sustaining and wear-resistant than the rim 15. In fact, for many applications, the rim 15 may comprise the same flexible plastic material as the flexible body portion 17. It is essential, however, that the material of the rim 15 and base 12 be compatible with the material of the flexible part 17 so as to bond efficiently thereto as described below.

Figure 4:
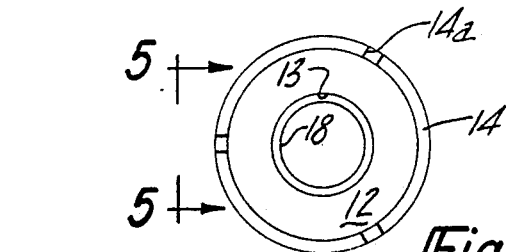
FIG. 4 is a fragmentary bottom view of a shield similar to FIG. 1, showing a modification.
Figure 5:
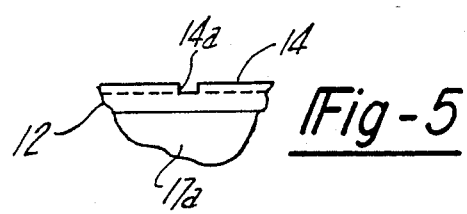
FIG. 5 is a fragmentary side elevational view taken in the direction of the arrows along the line 5—5 of FIG. 4.

FIGS. 4 and 5 illustrate a modification of the dust shield adapted for use when the base 12 is located uppermost, i.e., when the shield is used in an inverted position with respect to FIGS. 1 and 2. As illustrated, the wear-resistant bearing surface 14 is provided with several circumferentially spaced drain holes 14a to prevent the accumulation of water within the confines of the bead 14.

Figure 6:
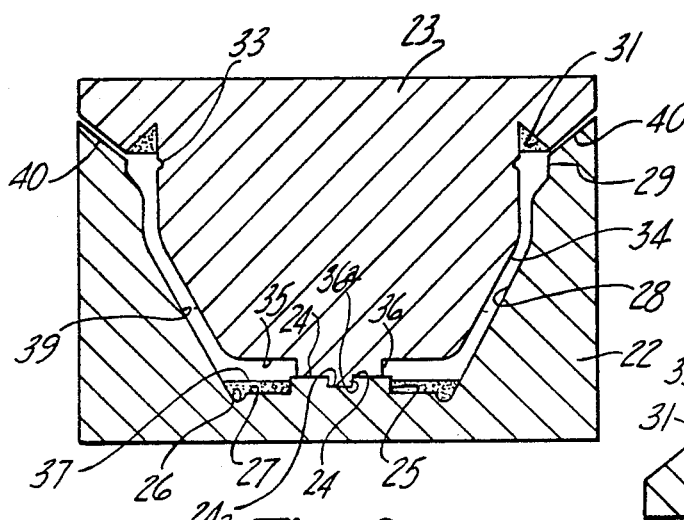
FIG. 6 is an axial mid-sectional view showing a preferred two-part mold useful in molding the shield of FIG. 2.
Figure 7:
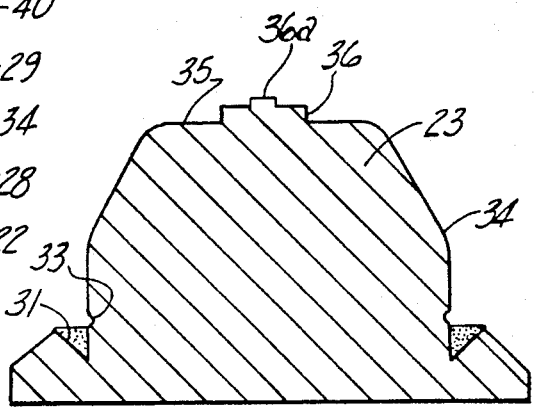
FIG. 7 is an axial mid-sectional view through one part of the mold illustrated in FIG. 6, but showing an earlier stage in the molding process.

Referring to FIGS. 6 and 7, a preferred two-part mold and method of using the same are illustrated. The mold comprises a bowl-shaped mold part 22 and a plunger-shaped mold part 23, FIG. 7, capable of being interfitted in predetermined coaxial alignment as illustrated in FIG. 6 to define a cavity for molding the entire body 10. Suitable means, such as recess 24a and closely interfitting pin means 36a, FIG. 7, may be provided for readily indexing the mold parts 22 and 23 and maintaining the same in the coaxial alignment of FIG. 6.

The bowl-shaped mold part 22 is provided with a coaxial cylindrical post 24 that contains the coaxial recess 24a and extends from the bottom of the bowl to provide a radially inner boundary for an annular base-forming recess 27. An annular step 25 around the post 24 provides an axially extending boundary for the recess 27 that defines the major axially outer surface of the base 12. Radially outwardly of the step 25, the recess 27 provides an annular coaxial bead-forming depression 26 for forming the wear-resistant bead 14. The radially outer wall of the depression 26 extends upwardly in FIG. 6 as a continuation of the bowl sidewall 28 of the mold part 22. The diameter of the axially upper portion of the sidewall 28 enlarges at 29 to provide for formation of the thickened periphery 17c.

As illustrated in FIG. 7, the plunger-shaped mold part 23 is provided with an annular coaxial rim-forming recess 31 shaped to define the rim 15. The radially outer wall of the recess 31 slopes radially outwardly and axially upwardly in FIG. 7 to define the aforesaid slope of the axially outer wall 15b of the rim 15. From the apex of the recess 31 in the position of FIG. 6, the peripheral wall 34 of the plunger mold 23 extends cylindrically downwardly and thence in parallelism and in spaced relationship with respect to the inner wall 28 to provide a sidewall-forming cavity between the walls 28 and 34. The cylindrical portion of wall 34 may be provided with a coaxial radially outwardly opening groove 33 to form the sealing bead 19 when the latter is desired.

When the mold parts 22 and 23 are assembled as in FIG. 6, the wall 34 terminates axially inwardly in an annular axially extending surface 35 of the mold part 23 spaced axially from the post 24 by a cylindrical coaxial second post 36 of the mold part 23 to define the axially extending inner surface of the base liner 17b. The confronting axial ends of the posts 24 and 36 are flush with each other, the pin means 36a of the post 36 extends coaxially into the recess 24a, and the peripheral cylindrical wall of the post 36 defines the radially inner boundary for the annular base liner 17b around the opening 18.

Prior to insertion of the plunger mold part 23 into the bowl-shaped mold part 22, a predetermined measured quantity of the plastic material for forming the base 12 is poured in a fluid phase into the recess 27 to a level slightly below the upper surface of the post 24 in FIG. 6. Since polyvinylchloride-plasticiser compositions typically tend to expand during the curing process, when such a plastic is employed, it should be poured to a predetermined level 37 slightly below the axial end of the post 24, as indicated by the stippled area in FIG. 6.

Similarly, when the plunger mold part 23 is in the position of FIG. 7, a measured quantity of fluid phase plastic material for forming the rim 15 is poured into the rim-forming recess 31 to slightly below the upper level of the radially outer sloping wall of recess 31, FIG. 7, to accommodate expansion during curing. Of course, if the rim 15 is to be formed from the same material as the portion 17, prior filling of the rim forming recess 31 will be unnecessary because the rim 15 will then be formed upon insertion of the plunger 23 into the bowl of the mold 22, as explained below.

After pouring the base-forming and rim-forming plastics into the recesses 27 and 31 respectively, the plastics are heated to a jelly-like consistency that is sufficiently hard and adherent to the sides of their respective cavities so that when a predetermined measured quantity of the sidewall-forming plastic is poured in a fluid stage into the bowl of the mold 22, the plastic in the recess 27 will not be appreciably disturbed, and such that when the plunger-shaped mold 23 is inverted and interfitted with the mold 22, the plastic within the recess 31 will remain in place. The partial solidification time for the polyvinylchloride-type plastic will be from approximately one to several minutes, depending upon the temperature of the mold parts 22, 23 when the liquid mixture is poured into the cavities.

When the aforesaid partial solidification or jelling has occurred, a predetermined measured quantity of a vinyl plastisol selected to provide the major resilient portion 17 of the body 10 is poured in a fluid phase into the bowl of the mold 22, as for example approximately to the level indicated by the dotted line 39. When filled to the level 39, the volume of fluid plastic within the bowl-shaped mold 22 will slightly exceed the volume required for forming the portion 17, thereby to assure intimate sealing contact with the partially solidified material within the recesses 27 and 31.

Immediately after filling the bowl of mold 22 to the level 39, the plunger-shaped mold part 23 is inverted and interfitted with the mold 22 in the aforesaid predetermined coaxial alignment therewith, as illustrated in FIG. 6, whereat the molds 22 and 23 in cooperation with the jelled or partially solidified plastic within the recesses 27 and 31 define a cavity for forming the flexible portion 17, including the bead 19, the sidewall 17a, the base liner 17b, and the annular enlargement 17c. As the plunger of mold part 23 moves into the bowl of the mold part 22, the fluid plastic within the bowl rises within the space between the sidewalls 28 and 34 to the level of the undersurface of the partially solidified plastic in the recess 31. The excess plastic is extruded through a small circumferentially extending escape passage 40 at the parting line between the mold parts 22 and 23. The passage 40 opens to the exterior of the mold at a level above the uppermost part of recess 31, FIG. 6, to assure filling of that recess with the fluid plastic employed to form the flexible body portion 17, in the event a harder and more rigid rim 15 is not desired.

Solidification of the plastic within the mold parts 22 and 23 is then completed, as for example conventionally by placing the assembled mold parts 22 and 23 in an oven to expedite the process. Thereafter the mold parts are separated, the completely molded shield is removed from the mold, and flashing from the escape passage 40 is removed. The continuity of the radially outer surfaces of the base 12 and portion 17 at the bonded juncture therebetween, and the coextensive surfaces 15a and 17d, enable molding of the entire shield body 10 by the process described in the simple two-part mold 22, 23, whereby the shield body 10 can be readily removed from the mold parts 22 and 23 without stretching or deforming the harder reinforcing parts 12 and 15 and thus without disrupting their bonds with the flexible part 17. If the recess 33 is provided to form the annular bead 19, the flexible material 17 at the bead 19 is sufficiently resilient so that it will readily deform within its elastic limit to enable separation of the molded body 10 from the plunger-shaped mold 23.

In a typical application of the shield, the body 10 is sleeved onto the threaded end 41 of a tapered ball-headed shaft 42. The body 10 is dimensioned so that the threaded end 41 readily extends through the coaxial openings in the annular base 12 and base liner 17b, but the diameter of the base liner opening 18 is dimensioned to provide an interference sealing fit with the portion 42a of shaft 42 adjacent to the underside of the housing 43 in FIG. 1. During assembly, the body 10 is moved upwardly into sealing position by the application of force to the underside of the annular thickening 17c, FIGS. 1 and 2, until the inner periphery 15c of the rim 15 engages the housing 43 also at an interference sealing fit. Accordingly, the thickened portion 17c serves both to facilitate mounting of the shield 10 on the ball-joint assembly and to increase the area of surface 17d in bonded contact with the rim surface 15a. As shown, the portion of housing 43 engaged by the inner rim periphery 15c is cylindrical. If that portion of housing 43 is tapered so as to enlarge upwardly, the rim 15 will flex sufficiently to cock surface 15a out of the coaxial alignment illustrated in FIG. 2, so as to conform to the taper of the exterior surface of housing 43. Such cocking of the harder material is facilitated by the oblique surface 15b which enables the upper portions of surface 15c to flex and conform to an upwardly diverging or conical exterior surface of the housing 43.

If the sealing bead 19 is provided, it will be flattened in sealing engagement with the adjacent periphery of the housing 43, which provides a socket mating with the ball-head of the shaft 42. Such structure may be conventional and is accordingly not shown in detail. The housing 43 may also be provided with a grease fitting 44, or the ball-head of the shaft 42 and the mating spherical socket portion within the housing 43 may be permanently prelubricated during assembly of the product. Where lubrication is required, it is preferable that the sidewall 17a be clear or transparent plastic so that an inspector can readily determine whether or not the ball-joint has been greased.

After the body 10 is mounted against the underside of the housing 43, a swinging operating lever or shaft 46 having a tapered shaft-receiving opening mating with the tapered portion 42a of shaft 42 is fitted on the latter and secured in position by a nut 47. In consequence, the resiliently yieldable portion 17 of the body 10 is deformed within its elastic limits, as illustrated at 17a in FIG. 1, to resiliently maintain the sealing engagement between the body 10 and the housing 43 and to force the portion of the liner 17b around the opening 18 into sealing engagement with the shaft 42.

In a specific embodiment of the structure described having an overall axial dimension of approximately one inch, the thickness of the sidewall 17a may be between approximately one-sixteenth and one-eighth of an inch. The axial deformation of the body 10 when in the sealing position shown on the ball-joint assembly 9 may amount to approximately twenty to fifty percent, and the reaction force required to maintain the body 10 in the deformed condition, which must be adequate to maintain the required seal between the rim 15 and housing 43, may be on the order of magnitude of five to ten pounds per square inch. The above noted values will of course vary considerably depending upon, among other factors, the size of the ball-joint assembly to be shielded and the operating temperature which affects the elasticity, resiliency, and hardness of the plastic body 10. The part cylindrical and part tapered shape of the sidewall 17a, assures that when the body 10 is deformed as in FIG. 1, sidewall 17a will bulge generally radially outwardly from the housing 43. In a typical construction, the shaft 42 is universally pivotal about the center of its ball head, as indicated by the arrows 48 in FIG. 1, and the shaft 46 seated against the bearing surface 14 is pivotal about the axis of the shaft 42. By virtue of the wear-resistant and low-friction bead 14, such swinging of the shaft 46 is facilitated with a minimum of wearing of the base 12 or frictional drag thereon that would tend to rotate the body 10 and interfere with the above described seals. By reason of the comparatively hard rigid rim 15 and base 12 of the one-piece body 10 and the resiliently flexible portion 17, the plane of the bearing surface of bead 14 remains flush with the plane upper surface of the portion of lever 46 seated thereat, the rim 15 remains fixed with respect to the body 43, and these relationships are accommodated during universal pivoting of the shaft 42 by flexing of the resiliently yieldable sidewall 17a. The rigid rim 15 in many instances eliminates the need for an external device to clamp the dust shield to the housing 43 and, in cooperation with the rigid base 12, provides a one-piece dust shield that does not require metal or hard plastic reinforcing inserts.

Still another important aspect of the shield construction described herein is the provision of the disc-like base 12 and liner 17b intimately bonded together essentially coextensively, except for the comparatively short, flat or plane, radially inward extension of the liner 17b beyond the periphery of opening 13 to the periphery of opening 18b for providing effective resilient sealing engagement with the shaft 42.

By virtue of the comparatively rigid base 12 bonded to the major portion of the liner 17b, the latter is stabilized dimensionally and reinforced against buckling when in sealing engagement with the shaft 42. Accordingly, the portion of the liner 17b in actual engagement with shaft 42 effects a much tighter and more effective seal than would otherwise be possible. The coaxial arrangement of the base 12 and liner 17b, readily achieved by the molding process described, assures that the seal will be uniformly effective entirely around the shaft 42.

STATE OF THE ART

The prior art is replete with sleeve-type dust shields of the general type described herein. The shields disclosed in the following United States patents are representative of the art known to applicants. It is requested that the following patents be made of record in this application U.S. Pat. No. 2,559,857 EDWARDS
U.S. Pat. No. 3,164,389 THOMAS
U.S. Pat. No. 3,175,834 WALLACE ET AL
U.S. Pat. No. 3,292,957 ULDERUP
U.S. Pat. No. 3,901,518 UCHIDA The patents noted above show that it is a commonplace to reinforce the coaxial opposite ends of a flexible sleeve-type shield by bonding or securing rings of harder material thereto.

Applicants are unaware of any teaching by the art of a shield comparable to the present invention comprising an annular reinforcing base 12 extending parallel to a plane normal to the axis of the shield 10 and pin 42 and bonded to the axially outer surface of a parallel base liner 17b, wherein the radially outer periphery of the reinforcing base 12 is essentially flush with the radially outer surface of the softer and more flexible sleeve material 17, and also comprising an annular reinforcing rim having an axially inner surface coextensive with and bonded to the axially outer surface 17d of the flexible material 17, whereby the entire multiple durometer shield body 10 is capable of being formed by a sequential molding process in a simple, two-part mold 22, 23 as taught herein, and whereby accurate coaxial alignment of the annular reinforcing base 12 and rim 15 with the ends of the flexible sleeve portion 17 is readily assured in production and the difficulty of aligning and supporting reinforcing inserts within a mold is avoided.

The patent to Wallace et al, U.S. Pat. No. 3,175,834, shows an annular reinforcement 43 bonded to the axially outer surface of a base liner having an annular seal 42, FIGS. 4 and 6, but the reinforcement 43 does not define one axial end of the shield, nor does Wallace et al teach applicants' reinforcing base 12 in combination with the reinforcing ring 15. The annular axial projection 45 of the flexible sidewall 47 of Wallace et al, which does form the axially outer end of the shield, prevents molding of a structure comparable to applicants' multiple durometer combination as claimed herein by a process comparable to applicants' using a two-part mold. Similarly, the radially outer periphery of the reinforcement 43 of Wallace et al is not flush with the outer periphery of the sidewall 47. In consequence, the resulting shield could not be formed by applicants' simple molding process, so that it is also clear that Wallace et al does not teach any reconstruction of the art necessary to achieve applicants' shield.

Uchida, U.S. Pat. No. 3,901,518, is similarly distinguishable from the invention described herein. The other patents listed above are even less relevant to the applicants' invention.

Prior to the present invention involving the concept of the essentially coextensive bonded-together disc-like base 12 and base liner 17b, a compressible lip-type seal comprising a cylindrical portion extending axially of the shield from a unitary liner bonded coaxially to an annular reinforcing base similar to the base 12, was developed by applicants' assignee in an attempt to effect a seal around a shaft such as 42. The cylindrical portion of the seal extended axially beyond the base 12 at a location spaced radially inwardly of the latter's inner periphery. The seal, however, was not commercially acceptable, was difficult and costly to manufacture, required 100% manual inspection, had more than a 50% scrap rate, could not satisfy customer requirements, and was thus discontinued.

We claim:

1. A multiple durometer dust and moisture shield for a ball-joint assembly, said shield comprising a one-piece bowl-shaped plastic body defining a part-receiving bowl, said body having an annular base defining one axial end of said body around a shaft-receiving opening through said base into said bowl, said base also having a plane axially inner surface, the axially outer surface of said base comprising a wear-resistant bearing surface, said body also having an annular rim defining the opposite axial end of said body around a major opening through said rim into said bowl, said body having a resilient portion comprising the sidewall of said bowl axially spacing said rim and base, said resilient portion extending axially from said rim around said major opening to said base and having an annular base liner, the axially outer surface of said base liner comprising a plane surface flush with and intimately bonded to the plane axially inner surface of said base, said plane surface of said base liner extending radially inwardly beyond said base and terminating at an axial opening coaxial with said shaft-receiving opening and of smaller circumference for effecting an interference fit with a shaft extending freely through said shaft receiving opening, said base extending radially outwardly at least to the radially outer periphery of said resilient portion, said resilient portion comprising a resiliently flexible material adapted to buckle radially and to fold axially within its elastic limit during operation to maintain resilient pressure urging said rim and base axially away from each other, said base comprising material appreciably harder and more rigid than the material of said resilient portion and essentially form-sustaining during operation, said base also having an annularly arranged wearing surface extending axially outwardly around said shaft-receiving opening and beyond said resilient portion to provide said wear-resistant bearing surface with an annularly arranged axially endwise facing surface of reduced area with respect to the total area of said outer surface of said base.

2. A dust shield according to claim 1, said wearing surface comprising a ring having a least one opening therein for passage of fluid radially therethrough.

3. A shield according to claim 1, said rim comprising a material appreciably harder and more rigid than the material of said resilient portion and essentially form sustaining during operation, said rim having an outer surface sloping radially outwardly of said bowl in the axial direction from said rim toward said base said resilient portion having an annular axial end portion coextensive with the axially inner surface of said rim and intimately bonded thereto.

4. A shield according to claim 3, said annular axial end portion bonded to said rim comprising a radially thickened sidewall portion of said bowl.

5. A shield according to claim 4, the radially inner surface of said rim and the axially adjacent radially inner surface of said sidewall comprising a continuous surface.

6. A shield according to claim 5, the radially inner surface of said radially thickened sidewall portion adjacent to said rim having an annular radially inwardly projecting sealing bead extending around said major opening.

7. A shield according to claim 3, said base having an annular wear ring extending axially outwardly from said axially outer surface around said shaft-receiving opening to provide said wear-resistant bearing surface with an annular axially endwise facing surface of reduced area with respect to said axially outer surface, the material of said resilient portion also comprising a transparent plastic, said annular resilient portion bonded to said rim comprising a radially thickened sidewall portion of said bowl, and the radially inner surface of said radially thickened sidewall portion adjacent to said rim having an annular radially inwardly projecting sealing bead extending around said major opening.

8. A shield according to claim 1, said base having an annular wear ring extending axially outwardly around said shaft-receiving opening and beyond said resilient portion to provide said wear-resistant bearing surface with an annular axially endwise facing surface of reduced area with respect to the total area of said base.

9. A multiple durometer dust and moisture shield for a ball-joint assembly, said shield comprising a one-piece bowl-shaped plastic body defining a part-receiving bowl, said body having an annular base defining one axial end of said body around a shaft-receiving opening through said base into said bowl, the axially outer surface of said base comprising a wear-resistant bearing surface, said body also having an annular rim defining the opposite axial end of said body around a major opening through said rim into said bowl, said body having a resilient portion comprising the sidewall of said bowl axially spacing said rim and base, said resilient portion extending axially from said rim around said major opening to said base, said resilient portion comprising a resiliently flexible material adapted to buckle radially and to fold axially within its elastic limit during operation to maintain resilient pressure urging said rim and base axially away from each other, said rim comprising a material appreciably harder and more rigid than the material of said resilient portion and essentially form-sustaining during operation, said resilient portion having an annular axial end portion intimately bonded to the axially inner surface of said rim, said annular axial end portion of said resilient portion bonded to said rim comprising a radially thickened sidewall portion of said bowl, said axially inner surface of said rim being coextensive with said thickened annular axial end portion and being bonded thereto throughout its coextensive surface, said rim having an outer surface sloping radially outwardly of said bowl in the axial direction from said rim toward said base, the coextensive bonded together axially inner surfaces of said rim and thickened axial end portion of said flexible material being flush with each other in a plane normal to the axis of said annular base.

10. A shield according to claim 9, the radially inner surface of said radially thickened sidewall portion adjacent to said rim having an annular radially inwardly projecting sealing bead extending around said major opening.

11. A shield according to claim 10, the radially inner surface of said rim and the axially adjacent radially inner surface of said thickened sidewall comprising a continuous surface and the sloping outer surface of said rim intersecting the radially outer periphery of said thickened sidewall portion.

* * * * *